3,099,628
POLYMERIZATION OF EPOXY COMPOUNDS
Charles E. Scott, Drexel Hill, Pa., assignor to Sun Oil Company, Philadelphia, Pa., a corporation of New Jersey
No Drawing. Original application June 24, 1959, Ser. No. 822,413, now Patent No. 3,016,394, dated Jan. 9, 1962. Divided and this application May 20, 1960, Ser. No. 30,452
3 Claims. (Cl. 260—2)

This invention relates to the preparation of polymers of epoxy compounds containing an oxirane radical in a polymerization process utilizing a novel catalyst. The catalytic material more particularly is a complex resulting from the reaction of a ferric halide with cyclododecatriene-1,5,9.

It is known that ferric chloride will catalyze the polymerization of olefin oxides. However, the reaction takes place so rapidly as to be essentially explosive and hence is practicallyy uncontrollable. The present invention provides a process for effecting this type of polymerization reaction which permits the reaction to be conducted under controllable conditions.

According to the invention a catalyst is prepared by reacting either $FeCl_3$ or $FeBr_3$ with cyclododecatriene-1,5,9 which, for the sake of brevity, is hereinafter sometimes referred to as "CDT." The latter compound can be prepared in a known manner, such as by contacting butadiene with a catalyst formed from titanium tetrachloride and diethyl aluminum chloride in a hydrocarbon solvent. It has now been discovered that CDT will react with ferric chloride or bromide to form an iron-containing complex which will catalyze the polymerization of epoxy compound containing an oxirane radical in a controllable manner. Hydrogen halide is also formed as a product of the reaction, and it has further been discovered that removal of the hydrogen halide from the complex greatly improves its activity as a polymerization catalyst.

The reaction product of the ferric halide with CDT is a dark solid material having a composition that has not been determined with certainty thus far. However, tests have indicated that it includes a crystalline component having the empirical formula $FeX \cdot (CDT)$, wherein X represents chlorine or bromine, in admixture with $FeX_2$ and possibly also with ureacted $FeX_3$. At least 70% of the iron in the product appears to be in the ferrous state.

The above-described catalytic product can be prepared simply by adding CDT to anhydrous $FeCl_3$ or $FeBr_3$. The reaction takes place quite readily at room temperature and is highly exothermic. An organic solvent such as chloroform, carbon tetrachloride, diethyl ether, pentane, hexane and the like can be included in the reaction mixture if desired, although this is not essential. After the reactants have been mixed and the exotherm is complete, it is preferable to heat the mixture for a time, for example to a temperature in the range of 60–100° C. for a time of 10 to 60 minutes. Thereafter, the reaction mixture is placed under a vacuum until all of the volatile material has been vaporized. This removes HCl formed as a result of the reaction and improves the catalytic activity of the product. This procedure yields a dark solid material which constitutes the catalyst of the present invention.

The catalyst is effective for polymerizing any epoxy compound containing an oxirane radical, such as ethylene oxide, propylene oxide, chloropropylene oxide, isobutylene oxide, styrene oxide and the like. The polymerization can be carried out at temperatures in the range of 0–150° C., with the reaction rate increasing as the temperature is increased. A solvent such as pentane, hexane, isooctane, benzene, toluene, petroleum ether or diethyl ether can be used if desired, although the use of a solvent is not required. The resulting polymerization product is a mixture of amorphous and crystalline polymers which are easily separable from each other by means of cold acetone, the amorphous material being soluble therein while the crystalline material is insoluble when the temperature of the acetone is below about —20° C. The amorphous polymer is an oily material suitable for use as a synthetic lubricant, and the crystalline material can be utilized to make molded articles, film and the like.

The following example is a specific illustration of the invention:

A catalyst is prepared by adding 15 ml. of CDT to 5.0 g. of anhydrous $FeCl_3$ at room temperature in a polymerization tube. After the exothermic reaction has stopped, the mixture is heated at 70° C. for about 30 minutes. The mixture is then placed under a vacuum until the HCl has been removed from it. 125 g. of propylene oxide are added to the tube and the mixture is gently agitated at room temperature for 96 hours. At the end of this time, 2500 ml. of acetone are added and the mixture is chilled to a temperature of about —25° C. The insoluble crystalline polymer is then separated from the amorphous material which remains in solution in the acetone. In this manner 40 g. of white solid polymer are obtained, and upon evaporating the acetone 36 g. of a viscous amorphous polymer are left as residue.

This application is a division of my copending application Serial No. 822,413, filed June 24, 1959, now Patent 3,016,394.

I claim:

1. Method of preparing a polymer which comprises contacting an epoxy compound selected from the group consisting of ethylene oxide, propylene oxide, chloropropylene oxide, isobutylene oxide and styrene oxide at a temperature in the range of 0–150° C. with a catalyst consisting essentially of a complex formed by reacting a ferric halide selected from the group consisting of $FeCl_3$ and $FeBr_3$ with cyclododecatriene-1,5,9 and by removing from the product HCl resulting from the reaction.

2. Method for preparing polyethers which comprises contacting an epoxy compound containing an oxirane radical and having the general formula

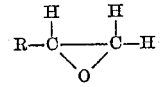

wherein R is selected from the group consisting of alkyl, aralkyl, and haloalkyl radicals, at a temperature in the range of 0–150° C. with a catalyst consisting essentially of a complex formed by reacting a ferric halide selected from the group consisting of $FeCl_3$ and $FeBr_3$ with cyclododecatriene-1,5,9 and by removing from the product HCl resulting from the reaction.

3. Method according to claim 2 wherein the ferric halide is $FeCl_3$.

References Cited in the file of this patent
UNITED STATES PATENTS
2,811,491 Pruitt et al. _____ Oct. 29, 1957